US012203458B2

(12) United States Patent
Kollen et al.

(10) Patent No.: US 12,203,458 B2
(45) Date of Patent: Jan. 21, 2025

(54) HYDRAULIC SUPPLY SYSTEM FOR A VEHICLE

(71) Applicant: KNORR-BREMSE SYSTEME FÜR SCHIENENFAHRZEUGE GMBH, Munich (DE)

(72) Inventors: Nico Kollen, Gilching (DE); Fabian Elwischger, Neufahrn (DE); Torsten Stickel, Gauting (DE); Marcus Clev, Munich (DE); Benjamin Hirth, Olching (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 590 days.

(21) Appl. No.: 17/611,566

(22) PCT Filed: Apr. 22, 2020

(86) PCT No.: PCT/EP2020/061162

§ 371 (c)(1),
(2) Date: Nov. 15, 2021

(87) PCT Pub. No.: WO2020/229111

PCT Pub. Date: Nov. 19, 2020

(65) Prior Publication Data

US 2022/0228582 A1 Jul. 21, 2022

(30) Foreign Application Priority Data

May 15, 2019 (DE) ..................... 10 2019 112 677.0

(51) Int. Cl.
*F17C 13/08* (2006.01)
*F04B 17/03* (2006.01)
(Continued)

(52) U.S. Cl.
CPC .............. *F04B 17/03* (2013.01); *F04B 53/00* (2013.01); *F04B 53/08* (2013.01); *F04B 53/16* (2013.01);
(Continued)

(58) Field of Classification Search
CPC .......... F04B 17/03; F04B 53/00; F04B 53/08; F04B 53/16; F15B 1/18; F15B 1/26; F15B 15/18; F15B 2211/20515
See application file for complete search history.

(56) References Cited

U.S. PATENT DOCUMENTS 4,833,971 A * 5/1989 Kubik ................. F15B 15/1466 91/519
6,132,184 A 10/2000 Robertson et al.
(Continued)

FOREIGN PATENT DOCUMENTS

CN 104235123 A 12/2014
CN 106884788 A 6/2017
(Continued)

OTHER PUBLICATIONS

Translation of EP1045143.*
International Search Report corresponding to PCT/EP2020/061162 dated Jun. 16, 2020.

*Primary Examiner* — P. Macade Nichols
(74) *Attorney, Agent, or Firm* — Barnes & Thornburg LLP

(57) ABSTRACT

A hydraulic supply system for at least one vehicle, in particular a rail vehicle, includes at least one drive motor, at least one flange, at least one hydraulic pump and at least one control plate for receiving and/or controlling further electrical and/or hydraulic components of the hydraulic supply system, wherein, in the mounted state, the flange is secured on the drive motor and on the hydraulic pump for the mutual mechanical coupling thereof, and wherein the flange is
(Continued)

secured on the control plate, wherein the flange also has at least one connector for coupling the hydraulic pump to the control plate, and wherein the flange has at least one electrical coupling element for electrically coupling the drive motor to the control plate.

13 Claims, 3 Drawing Sheets

(51) Int. Cl.

| | |
|---|---|
| ***F04B 53/00*** | (2006.01) |
| ***F04B 53/08*** | (2006.01) |
| ***F04B 53/16*** | (2006.01) |
| ***F15B 1/18*** | (2006.01) |
| ***F15B 1/26*** | (2006.01) |
| ***F15B 15/18*** | (2006.01) |

(52) U.S. Cl.

CPC .................. *F15B 1/18* (2013.01); *F15B 1/26* (2013.01); *F15B 15/18* (2013.01); *F15B 2211/20515* (2013.01)

(56) References Cited

U.S. PATENT DOCUMENTS

| | | | |
|---|---|---|---|
| 6,168,393 | B1 | 1/2001 | Huber et al. |
| 2013/0280110 | A1 | 10/2013 | Gutjahr et al. |
| 2018/0320674 | A1 | 11/2018 | Clev |

FOREIGN PATENT DOCUMENTS

| | | | | |
|---|---|---|---|---|
| DE | 3227926 | A1 | 2/1984 | |
| DE | 29906881 | U1 | 7/1999 | |
| DE | 20007554 | U1 | 8/2000 | |
| DE | 19959022 | C1 | 6/2001 | |
| DE | 202005005620 | U1 | 8/2006 | |
| DE | 102008058284 | A1 | 5/2010 | |
| DE | 102014212917 | A1 | 1/2016 | |
| DE | 102015119055 | A1 | 5/2017 | |
| DE | 102015221318 | A1 | 5/2017 | |
| EP | 0857871 | A1 | 8/1998 | |
| EP | 1045143 | A1 * | 10/2000 | .............. F04B 17/03 |
| EP | 1118527 | A1 | 7/2001 | |
| EP | 2746590 | A1 | 3/2016 | |
| WO | 2012079654 | A1 | 6/2012 | |

* cited by examiner

HYDRAULIC SUPPLY SYSTEM FOR A VEHICLE

CROSS REFERENCE AND PRIORITY CLAIM

This patent application is a U.S. National Phase of International Patent Application No. PCT/EP2020/061162 filed Apr. 22, 2020, which claims priority to German Patent Application No. 10 2019 112 677.0, the disclosure of which being incorporated herein by reference in their entireties.

FIELD

Disclosed embodiments relate to a hydraulic supply system for at least one vehicle, in particular a rail vehicle, having at least one drive motor, having at least one flange, having at least one hydraulic pump, and having at least one control plate for receiving and/or controlling further electrical and/or hydraulic components of the hydraulic supply system.

BACKGROUND

Generally, the function of a hydraulic supply system is to provide to the hydraulic consumers of a rail vehicle (e.g., level control cylinders, braking systems, other hydraulic functional elements) a hydraulic pressure or mass flow that is controlled or regulated, that is to say in accordance with demand.

Constant technical advancement in vehicle construction and, in particular, in rail vehicle construction, demands a continuously decreasing space requirement with an at least constant functionality density, in order, for example, to integrate additional functional elements into the vehicle, to save weight and material and/or to ensure simpler production and assembly.

This demand applies also to a hydraulic supply system for rail vehicles, also referred to as a hydraulic unit, which, likewise while retaining the same range of functions, is to take up less installation space, weight and material.

SUMMARY

Owing to the configurations of the hydraulic devices or hydraulic units from the prior art, space-specific optimizations by which the function density of such hydraulic supply systems can be further optimized still arise.

Disclosed embodiments further develop a hydraulic supply system of the type mentioned at the beginning in an advantageous manner, in particular, to the effect that the hydraulic supply system has a higher functionality density, can be operated reliably and is optimized in terms of installation space, weight and costs.

Accordingly, disclosed embodiments provide a hydraulic supply system for at least one vehicle, in particular a rail vehicle, having at least one drive motor, having at least one flange, having at least one hydraulic pump, and having at least one control plate for receiving and/or controlling further electrical and/or hydraulic components of the hydraulic supply system, wherein the flange, in the mounted state, is fastened to the drive motor and to the hydraulic pump for the mutual mechanical coupling thereof, and wherein the flange is fastened to the control plate, wherein the flange further has at least one connector for the coupling of the hydraulic pump with the control plate, and wherein the flange has at least one electrical coupling element for the electrical coupling of the drive motor with the control plate.

BRIEF DESCRIPTION OF FIGURES

Further details and advantages of the disclosed embodiments will now be explained in greater detail with reference to an exemplary embodiment illustrated in the drawings.

In the drawings.

DETAILED DESCRIPTION

Figure 1:
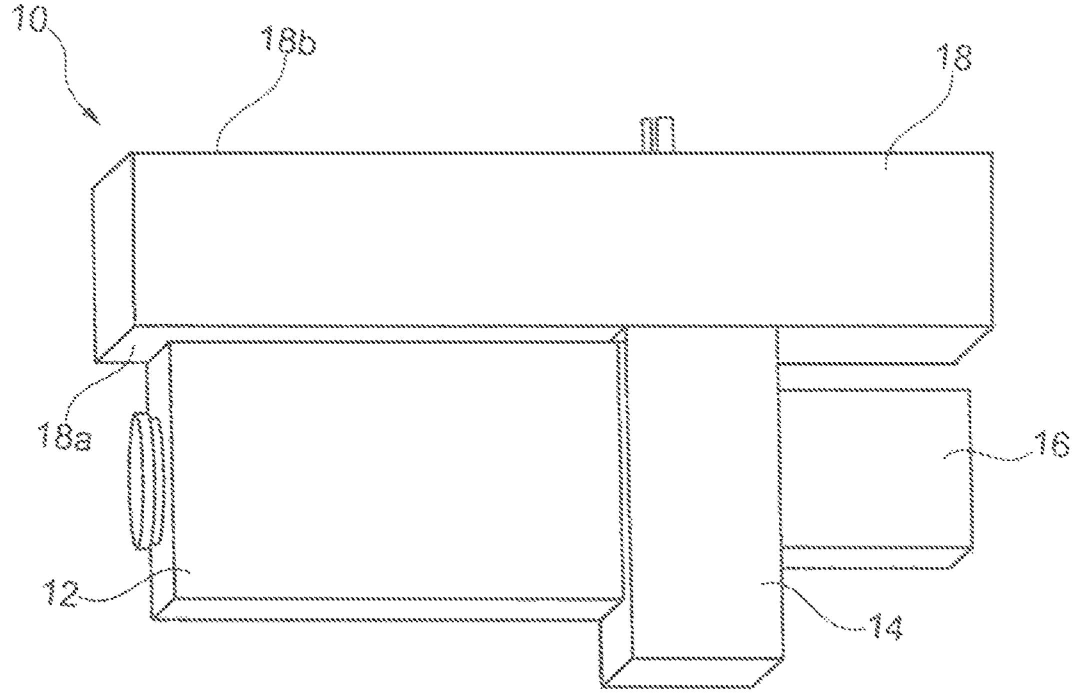
FIG. 1 is a schematic, partially perspective illustration of an exemplary embodiment of a hydraulic supply system according to the disclosed embodiments.

As explained above, hydraulic supply systems or hydraulic supply units are already known from the prior art.

For example, there is known from DE 82 04 096 U1 a device for fastening a pump unit, consisting of an electric motor, a pump bracket and a pump, in particular a hydraulic pump, to a support, wherein there is further provided an annular rubber-metal element which is arranged between a flange of the pump bracket and the support.

Furthermore, DE 196 12 582 A1 discloses a drive unit for a vehicle, which drive unit has an electric motor and a hydraulic pump with a suction opening and a pressure line for a hydraulic drive mounted on the vehicle. The pump can be driven by the shaft of an electric motor. For sound damping and/or in order at the same time to achieve improved protection against explosion, optionally at the same time with good heat dissipation, the electric motor and the pump are together accommodated as a structural unit in the hydraulic tank.

In addition, there is shown in DE 10 2004 032 256 B3 a hydraulic unit for industrial trucks, having a motor pump unit which is directly attached to a tank, a reflux filter which has an elongate filter casing for a filtering element, which can be introduced into the tank via an opening, a hose connection and an outlet opening, wherein the filtering element is arranged in the flow path between the hose connection and the outlet opening, a reflux hose between the motor pump unit and the hose connection, and a closure for the reflux filter, wherein the reflux hose extends within the tank and the hose connection is arranged within the tank.

Moreover, there is disclosed in WO 2017/077060 A1 a hydraulic device for a rail vehicle, which device comprises a tank region for a hydraulic fluid, a motor having a pump for pumping the hydraulic fluid, a hydraulic connection panel for providing hydraulic fluid paths and for holding hydraulic components, a control region for controlling the hydraulic components, and a housing. The tank region and the control region are arranged on opposite sides of the hydraulic connection panel.

Owing to the configurations of the hydraulic devices or hydraulic units from the prior art, space-specific optimizations by which the function density of such hydraulic supply systems can be further optimized still arise.

Disclosed embodiments further develop a hydraulic supply system of the type mentioned at the beginning in an advantageous manner, in particular, to the effect that the hydraulic supply system has a higher functionality density, can be operated reliably and is optimized in terms of installation space, weight and costs.

Accordingly, disclosed embodiments provide a hydraulic supply system for at least one vehicle, in particular a rail vehicle, having at least one drive motor, having at least one flange, having at least one hydraulic pump, and having at least one control plate for receiving and/or controlling further electrical and/or hydraulic components of the hydraulic supply system, wherein the flange, in the mounted state, is fastened to the drive motor and to the hydraulic pump for the mutual mechanical coupling thereof, and wherein the flange is fastened to the control plate, wherein the flange further has at least one connector for the coupling of the hydraulic pump with the control plate, and wherein the flange has at least one electrical coupling element for the electrical coupling of the drive motor with the control plate.

The connector can in particular be a hydraulic coupling such as a hydraulic line. Any other suitable type of coupling or type of connection is also conceivable.

Disclosed embodiments are based on the fundamental idea that, against the background of the continually increasing space requirements in rail vehicle construction, a hydraulic supply system having a flange for the mutual connection of the drive motor and the hydraulic pump with increased function integration is provided. The increased integration of additional functions by means of the flange ensures in particular the electrical and hydraulic coupling of the drive motor and the hydraulic pump with the control plate. The control plate forms an interface element between the electrical and/or hydraulic components received thereby, such as valves, lines, connections or actuating elements, and the drive motor and the hydraulic pump which supplies the components with hydraulic pressure. Moreover, by means of the flange, on the one hand the hydraulic fluid under the desired operating pressure can be introduced into the control plate and on the other hand a supply of power and the control or regulation of the drive motor can take place. The flange is thereby configured such that the cables necessary therefor do not come into contact with the hydraulic fluid. As a result of the high degree of function integration within the flange, an even more compact hydraulic supply system is accordingly provided, which is able to meet the continually increasing space requirements, as described hereinbefore, in an even better or even more suitable manner Moreover, it can be provided that the flange is an integral part of the drive motor, wherein at least one mechanical receiver for the hydraulic pump is formed by means of the flange. The structural configuration of the flange as an integral part of the drive motor permits a particularly space-saving coupling possibility between the flange and the drive motor, so that the required installation space of the hydraulic supply system can be further reduced or optimized. The flange forms such an integral part of the drive motor that the flange and the drive motor in the mounted state form a common structurally configured structural unit. The common structural unit can be realized in the mounted state by means of a common housing or by a common housing group.

The drive motor can be in the form of an electric motor, for example, of which the speed, torque or the delivery power resulting therefrom is adjustable or controllable. The electric motor can be in the form of a synchronous machine or in the form of an asynchronous machine. The hydraulic pump is configured as a displacement pump, which is likewise adjustable in terms of the mass flow to be delivered and the pump pressure of the controlled or regulated drive motor. Types of hydraulic pump can be, for example, a vane pump (rotary vane pump), a gear pump (with internal or external toothing), a screw pump, an axial piston pump (bent axis or swash plate), a radial piston pump (inside or outside impinged), a reciprocating piston pump.

It is further conceivable that the connector is in the form of at least one hydraulic line and/or in the form of at least one hydraulic bore. The configuration as a hydraulic line ensures a direct and loss-optimized flow path or supply path between the control plate and the hydraulic pump via the flange. For this purpose, the hydraulic line can either be guided inside the flange in a corresponding bore or it can be guided or fastened thereto, for example, in the region of the flange or adjacent thereto, for example outside the flange, by means of corresponding supports. A hydraulic line can generally be understood as being any technical line element or device which is suitable for conducting the hydraulic fluid or hydraulic oil pressurized by the hydraulic pump to the control plate in the intended manner. Specifically, the hydraulic line can be understood in particular as being a hydraulic hose or hydraulic pipe which connects the hydraulic pump to the control plate by means of the flange. The hydraulic bore is to be understood in particular as being a recess of the flange, wherein the type and shaping of the recess can have many different configurations. The hydraulic bore can thus be in the form of a bore, groove, cavity, channel, opening, pocket, etc. of any form.

In addition, it is conceivable that the electrical coupling element is in the form of at least one flange cable feedthrough and/or in the form of at least one flange cable duct. The flange cable feedthrough and/or the flange cable duct ensure reliable separation of the electrical coupling element from the connector. This separation is important and advantageous in particular in view of overall operation of the hydraulic supply system that is reliable and as failure-free as possible. The flange cable feedthrough can be configured as a cavity or bore of the flange, within which there extend in the mounted state one or more cables for supplying power to and for controlling or regulating the drive motor. In addition or alternatively, the electrical coupling element can have a flange cable duct which is in the form of a hose (e.g., a corrugated hose) or in the form of a similarly suitable component. The electrical coupling element can accordingly be understood as being a device by means of which the drive motor, starting from the control plate, is supplied with electrical energy or can be controlled and regulated. Consequently, the electrical coupling element can be understood either as being a guiding device or accommodating device for the one or more cables for supplying power to and for controlling or regulating the drive motor or, together with those cables, can be regarded as an entire electrical coupling element. In principle, however, it is also conceivable that the electric lines or electric cables can also be guided or are arranged outside the flange.

It is additionally possible that the flange has at least one flange housing in which the electrical coupling element and/or the connector are integrated. The integration facilitates a very space-saving construction of the flange, since the structural dimensions of the electrical coupling element and/or of the connector, based on the overall dimensions of the flange housing, are small and thus can readily be integrated inside the flange housing. Moreover, the integration shortens the flow paths for the hydraulic oil from the hydraulic pump to the control plate, or shortens the line paths for the electric cables from the drive motor to the control plate. As a result of this shortening, the hydraulic supply system can work even more efficiently, so that the overall efficiency is improved further.

Furthermore, it can be provided that the hydraulic supply system has at least one control and/or regulating device which, in the mounted state, is electrically connected by means of the control plate and/or the electrical coupling element to the drive motor. The control and/or regulating device indirectly ensures delivery of the hydraulic oil from the hydraulic pump to the control plate according to demand in that it is able to control or regulate the speed or torque of the drive motor. A control and/or regulating device can in particular also be understood as being simply a device for controlling the drive motor. Furthermore, a control and/or regulating device can be understood as being a device for purely regulating the drive motor in response to the required hydraulic parameters of the hydraulic supply system. The control and/or regulating device can further perform tasks of both controlling and regulating the drive motor. In principle, it is also conceivable that the motor is designed to be uncontrolled and/or unregulated. Forms with an integrated control electronics are also conceivable.

It is likewise conceivable that the drive motor and the hydraulic pump in the fastened state are mechanically fastened by means of the flange to a least one face, in particular a broad face, of the control plate. Mechanical fastening to a broad face of the control plate permits a very space-saving lateral arrangement of the drive motor-hydraulic pump assembly group on the control plate. This type of arrangement above all makes it possible that the above-mentioned arrangement does not extend beyond the dimensions of the broad face of the control plate, so that a space-optimized overall arrangement between the control plate, the drive motor, the flange and the hydraulic pump can be provided. Such a space-optimized overall arrangement also permits more structural degrees of freedom for further optimizing the control and/or regulating device likewise in terms of a space-saving configuration. Finally, in previous solutions in the prior art, the drive motor was arranged in the region of the control and/or regulating device. Additionally, by means of a single component, namely the flange, the drive motor and the hydraulic pump can be fastened in a structurally very simple manner to the control plate, so that additional fastening elements for the drive motor and/or the hydraulic pump can in this respect be dispensed with.

In addition, it is conceivable that the flange has at least one shaft tunnel in which an end of at least one motor shaft of the drive motor and an end of at least one pump shaft of the hydraulic pump are coupled in a rotationally fixed manner by means of at least one coupling. As well as receiving or integrating the electrical coupling element and/or the connector and mechanically coupling the drive motor and the hydraulic pump, the flange can additionally ensure protected, rotationally fixed coupling of the motor shaft and the pump shaft. Thus, as is conventional in the prior art, the shaft tunnel inside the control plate can be omitted, which either saves additional installation space, or newly gained installation space for the integration of further electro-hydraulic components can thereby be provided. In this respect, on the one hand the production and the construction of the control plate can be simplified. Moreover, by omitting the shaft tunnel in the control plate, the electrical and hydraulic wiring complexity thereof can be reduced. On the other hand, the function density of the flange can be increased further, which results in an even more compact overall construction.

It is further possible that at least one bearing device for supporting the motor shaft is arranged in the flange. The additional bearing device allows the effective bearing clearance relative to a further bearing device of the drive motor that is necessarily present to be increased. As a result, transverse forces on the drive shaft and on the drive motor can be reduced overall due to the increased axial bearing clearance. Consequently, the bearing devices and the drive motor can also thus be adapted or optimized in accordance with these requirements in terms of size and weight. A further possibility is thus indicated of how, by a further function integration of the flange, the drive motor and thus the hydraulic supply system overall can be made even more compact and more efficient.

In addition, it can be provided that, in the mounted state, at least a first seal is arranged between the flange and the hydraulic pump and/or at least a second seal is arranged between the flange and the control plate. Since both the coupling region between the flange and the hydraulic pump and between the flange and the control plate abut one another in the mounted state, effective and reliable sealing can be implemented in a structurally simple manner in this region in particular. The sealing action can be ensured very simply and reliably in the case of mutually abutting components in particular by resilient sealing elements (such as gaskets) as a result of a high contact pressure per unit area. However, reliable operation of the hydraulic supply system is ensured only when the hydraulic components, or the connector, are reliably separated from the coupling element, or components, whereby reliable sealing is particularly important. A further seal serves in this sense also to reliably seal the shaft tunnel in particular with regard to the connector for connection between the hydraulic pump and the control plate. In addition, it is conceivable that at least a third seal for the electrical coupling element is arranged between the flange and the control plate. This seal has substantially the same functions as the first and second seal as described hereinbefore.

It is further conceivable that the hydraulic supply system has at least one hydraulic tank in which, in the mounted state, the drive motor and the flange as well as the hydraulic pump are arranged. Integration of the assembly group, or structural unit, drive motor, flange and hydraulic pump inside the tank permits a further possibility for configuring the hydraulic supply system to be very compact and space-saving overall. In addition, part of the supply lines for the hydraulic pump are no longer required since they are able to draw the hydraulic oil or the hydraulic fluid directly from the tank, which likewise has an advantageous effect on the weight and the installation space of the hydraulic supply system. Moreover, more effective cooling of the above-described assembly group takes place as a result of this type of integration. The tank can additionally be of very simple construction since, owing to the structural design of the flange, no hydraulic supply lines from the tank to the control plate have to be provided, or the tank does not have to be connected to the control plate in a manner other than via the flange.

It is also conceivable that the flange has at least one further hydraulic line and/or at least one further hydraulic bore by means of which the hydraulic tank and the control plate can be connected. As already explained hereinbefore, the tank can additionally be of very simple construction, owing to the additional hydraulic line and/or hydraulic bore, since, owing to the structural design of the flange, no hydraulic supply lines from the tank to the control plate have to be provided. A very simple structural configuration can thus be provided for returning the hydraulic oil or hydraulic fluid required by the hydraulic supply system back to the tank again and thus forming a closed circuit.

Furthermore, it is possible that the flange has at least one cooling body. By means of the cooling body, the flange itself can be thermally relieved and a heat sink for the drive motor and the hydraulic pump can also be formed. Consequently, the drive motor and the hydraulic pump can be thermally relieved and cooled more effectively or efficiently, which results in a longer working life or in more reliable operation of the hydraulic supply system. Moreover, it can be provided that the tank is additionally connected to a hydraulic oil cooler. The hydraulic oil can thereby first be cooled before it enters the hydraulic pump, so that overheating of the hydraulic supply system can be avoided.

It can further be provided that the flange, in the mounted and operation-ready state, is arranged between the drive motor and the hydraulic pump. Such a structural arrangement permits a very space-saving and simply constructed mechanical connection or coupling between the drive motor and the hydraulic pump. In addition, the two ends of the pump shafts and the drive shaft can be protected, sealed and connected to one another in a rotationally fixed manner inside the flange. In addition, the shaft ends in such a flange arrangement can be arranged substantially in alignment with one another, which additionally simplifies the mechanical construction. Fastening of the drive motor, or of the housing thereof, and the hydraulic pump thereby likewise takes place in a very simple manner, since they can simply be fastened in a very space-saving manner to opposite sides of the flange.

FIG. 1 is a schematic, perspective illustration of a detail of an exemplary embodiment of a hydraulic supply system 10 according to the disclosed embodiments for a rail vehicle (not shown in FIG. 1).

The hydraulic supply system 10 comprises a drive motor 12, a flange 14, a hydraulic pump 16 and a control plate 18 for receiving and controlling further electrical and hydraulic components 20 of the hydraulic supply system 10.

The flange 14, in the mounted state, is fastened to the drive motor 12 and to the hydraulic pump 16 for the mutual mechanical coupling thereof.

The flange 14 is further fastened to the control plate 18.

According to FIG. 1, the control plate 18 is in the form of a quadrangular plate having a first and a second broad face 18*a*, 18*b*, which are arranged opposite and parallel to one another, and four narrow faces adjacent orthogonally to the broad faces.

The above components according to FIG. 1 are thereby coupled with or connected to one another as follows:

The drive motor 12 and the hydraulic pump 16 are connected to one another in the fastened state by means of the flange 14 such that their respective center axes are substantially in alignment with one another.

Furthermore, in the mounted and fastened state, the center lines of the drive motor 12 and of the hydraulic pump 16 are substantially parallel to a longitudinal axis of the control plate.

All statements that are characterized within the scope of this disclosure by the term “substantially” are to be assumed to be dimensions with mutual tolerances, which are well known to the person skilled in the art.

The drive motor 12 and the hydraulic pump 16, in the fastened state, are mechanically fastened to a broad face 18*a* of the control plate 18 by means of the flange.

Fastening is effected by means of four fastening screws which, in the mounted state, extend orthogonally relative to the center lines of the drive motor 12 and of the hydraulic pump 16.

The four fastening screws form with the flange 14 and the control plate 18 a symmetrical fastening profile.

More or fewer than four fastening screws can also be provided for fastening the flange 14 to the control plate 18.

The flange 18 is further arranged in the mounted and operation-ready state between the drive motor 12 and the hydraulic pump 16.

Figure 2:
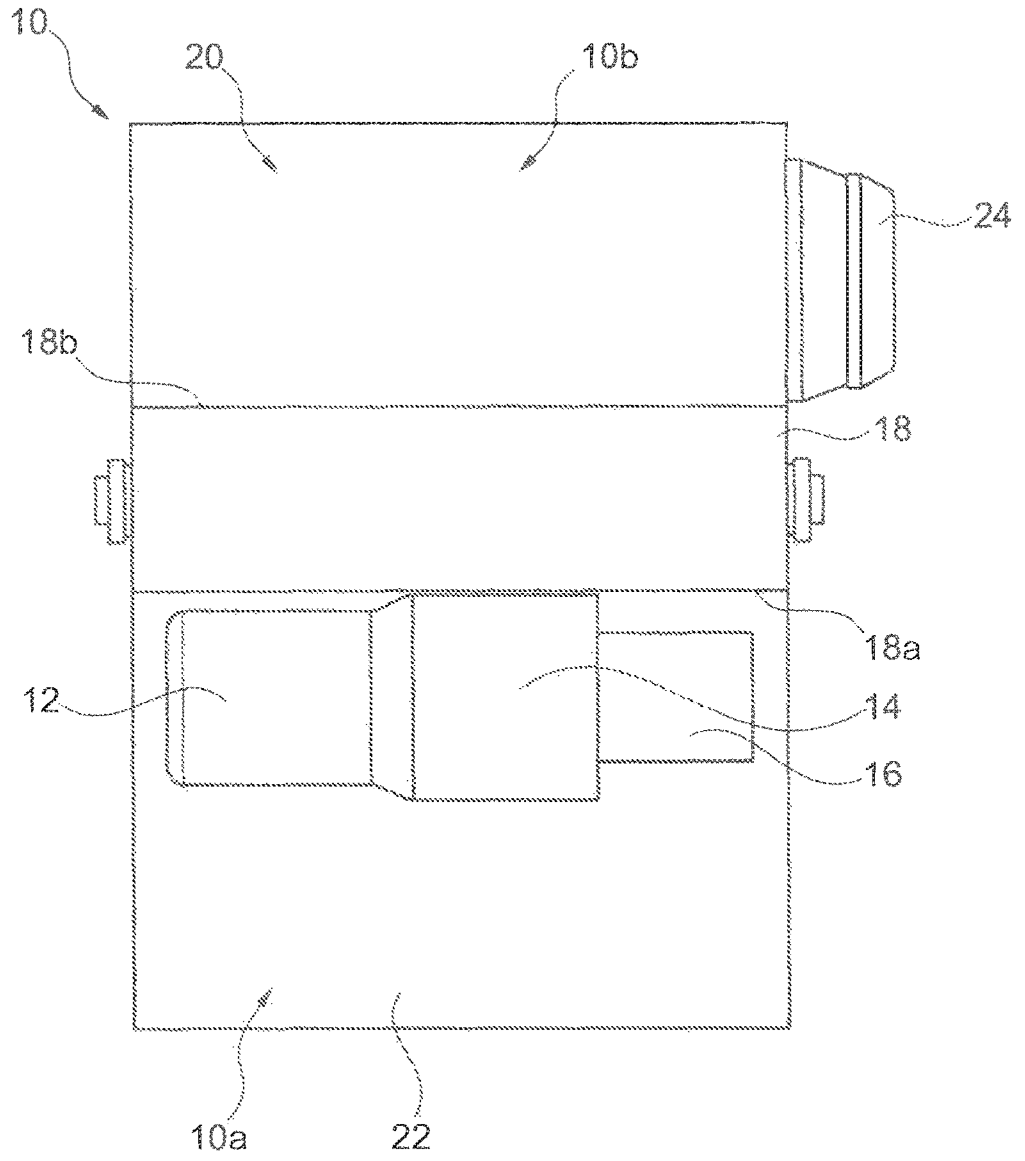
FIG. 2 is a schematic overall plan view of the exemplary embodiment of the hydraulic supply system according to FIG. 1.

FIG. 2 is a schematic plan view of the exemplary embodiment of the hydraulic supply system 10 according to the disclosed embodiments according to FIG. 1.

The hydraulic supply system 10 is divided into two part-regions 10*a*, 10*b*, wherein the control plate 18 is in the form of a hydraulic interface element between the part-regions 10*a*, 10*b*.

As explained hereinbefore in connection with FIG. 1, the control plate 18 has two mutually opposite broad faces 18*a*, 18*b*, to which there are attached the two part-regions 10*a*, 10*b*.

The first part-region 10*a* is formed adjacent to the broad face 18*a*, to which the assembly group comprising the drive motor 12, the flange 14 and the hydraulic pump 16 is fastened.

The first part-region 10*a* has, or is formed by, a hydraulic tank 22, in which, in the mounted state, the drive motor 12 and the flange 14 as well as the hydraulic pump 16 are arranged.

The hydraulic pump 16 further has on its intake side an intake for hydraulic oil or hydraulic fluid, the open end of which can end at different heights inside the hydraulic tank 22.

The hydraulic supply system 10 further has a control and regulating device 24.

The control and regulating device 24 can also be understood such that it is merely in the form of a control device 24 for the hydraulic supply system 10.

In addition, the control and regulating device 24 can also further be understood such that it is merely in the form of a regulating device 24 for the hydraulic supply system 10.

The second part-region 10*b*, which is adjacent or attached to the second broad face 18*b* of the control plate 18, accordingly comprises the control and regulating device 24 and is thus in the form of a control and regulating region.

The second part-region 10*b* further comprises further hydraulic or electrohydraulic components 20, such as, for example, shift valves, control valves, regulating valves or pressure limiters, which are hydraulically connected to the control plate 18.

Moreover, some of these components 20 are received by the control plate 18.

The control plate 18 itself has a plurality of hydraulic lines or hydraulic bores, which extend inside the control plate.

The hydraulic lines or hydraulic bores form various hydraulic paths between the hydraulic pump 16 and the hydraulic or electrohydraulic components 20.

It can additionally be seen in FIG. 2 that the flange 14 is an integral part of the drive motor 12.

Moreover, by means of the flange 14, a mechanical receiver for the hydraulic pump 16 is formed on the drive motor.

Figure 3:
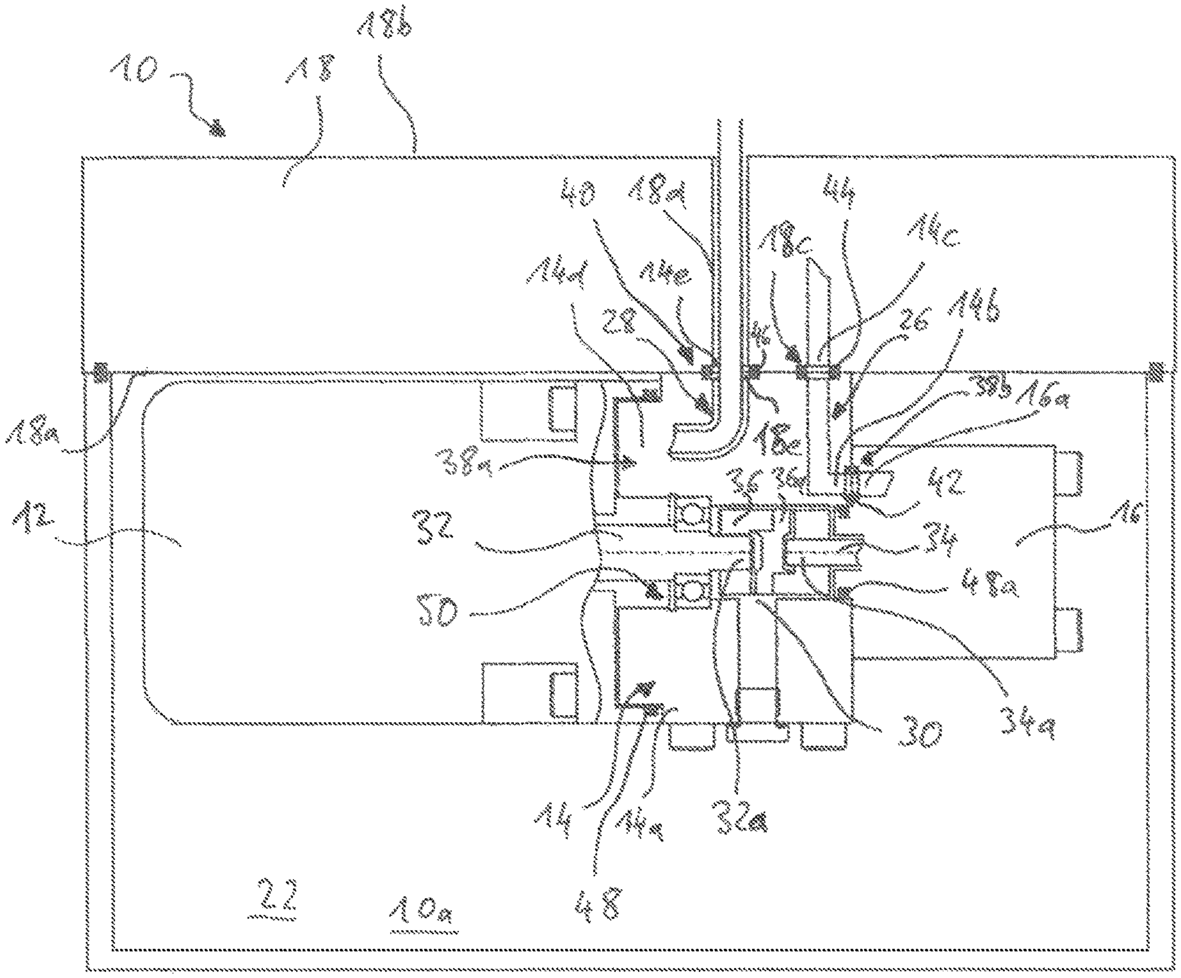
FIG. 3 is a schematic partial section view of the drive motor, the flange, the control plate and the hydraulic pump of the hydraulic supply system according to FIG. 1.

FIG. 3 is a schematic partial section view of the drive motor 12, the flange 14 and the hydraulic pump 16 and also of the control plate 18 of the hydraulic supply system 10 according to the disclosed embodiments according to FIG. 1.

According to FIG. 3, the flange 14 has a connector 26 for the hydraulic coupling of the hydraulic pump 16 with the control plate 18.

In addition, the flange 14 has an electrical coupling element 28 for the electrical coupling of the drive motor 12 with the control plate 18.

The flange 14 further comprises a flange housing 14*a* in which the electrical coupling element 28 and the connector (also referred to as a hydraulic coupling element) 26 are integrated.

The connector 26 is in the form of a hydraulic bore.

The hydraulic bore forms a substantially right-angled flow channel or flow path inside the flange housing 14*a* and is formed by means of two part-hydraulic bores.

According to a further exemplary embodiment (not shown in FIG. 3), it is likewise conceivable that the connector 26 is in the form of a hydraulic line.

The electrical coupling element 28 is in the form of a flange cable feedthrough.

The flange cable feedthrough forms a substantially right-angled flange cable feedthrough inside the flange housing 14*a* and is likewise formed by means of two part-bores.

Inside the flange cable feedthrough there extends a plurality of cables for supplying power to and controlling or regulating the drive motor 12.

These cables extend, starting from the control and regulating device 24, to the control plate 18 and, from the control plate 18, to the drive motor 12.

The electrical coupling element 28 can thus be understood in the form of the flange cable feedthrough as such on its own, or as a combination of the flange cable feedthrough with the above-described cables.

According to a further exemplary embodiment (not shown in FIG. 3), it is likewise conceivable that the electrical coupling element 28 additionally has a flange cable duct which extends inside the flange cable feedthrough.

The flange 14, or the flange housing 14*a,* further has a shaft tunnel 30.

The shaft tunnel 30 is in the form of a cylindrical passage in a central region of the flange housing 14*a*.

In the shaft tunnel 30, an end 32*a* of a motor shaft 32 of the drive motor 12 and an end 34*a* of a pump shaft 34 of the hydraulic pump 16 are coupled in a rotationally fixed manner by means of a coupling 36.

The coupling 36 is hereby in the form of a claw coupling with an integrated damping element 36*a*.

The above components according to FIG. 3 are thereby coupled with or connected to one another as follows:

In the mounted state according to FIG. 3, the flange 14 forms a coupling region in each case with the drive motor 12, the hydraulic pump 16 and with the control plate 18.

In the mounted state, the drive motor 12 and the flange 14 form a flange/motor-side coupling region 38*a*.

Furthermore, in the mounted state, the hydraulic pump 16 and the flange 14 form a flange/pump-side coupling region 38*b*.

In addition, in the mounted state, the control plate 18 at its broad face 18*a* and the flange 14 form a flange/control plate-side coupling region 40.

Moreover, the flange 14, or the flange housing 14*a,* has a pump-side hydraulic connection 14*b* and a control plate-side hydraulic connection 14*c*.

The hydraulic pump 16 further comprises a first flange-side hydraulic connection 16*a,* and the control plate 18 accordingly comprises a second flange-side hydraulic connection 18*c*.

The flange housing 14*a* further comprises a motor-side feedthrough interface 14*d* and a control plate-side feedthrough interface 14*e,* each of which delimits the cable feedthrough 28 inside the flange 14.

The motor-side feedthrough interface 14*d* and a control plate-side feedthrough interface 14*e* each form connection points or passages for electric cables for controlling or regulating and for supplying power to the drive motor 12.

The control plate 18 further contains a control plate cable feedthrough 18*d,* which is delimited on the flange side by a flange-side feedthrough interface 18*e.*

The pump-side hydraulic connection 14*b* of the flange 14 and the first flange-side hydraulic connection 16*a* of the hydraulic pump 16 are directly connected to or coupled with one another at the flange/pump-side coupling region 38*b*.

The second flange-side hydraulic connection 18*c* of the control plate 18 and the control plate-side hydraulic connection 14*b* of the flange 14 are in turn directly connected to or coupled with one another at the flange/control plate-side coupling region 40.

Consequently, the first and the second flange-side hydraulic connections 16*a,* 18*c* of the hydraulic pump 16 and of the control plate 18, respectively, are connected together via the connector 26.

Furthermore, the control plate-side feedthrough interface 14*e* of the flange 14 and the flange-side feedthrough interface 18*e* of the control plate 18 are likewise directly connected to one another at the flange/control plate-side coupling region 40.

In addition, in the mounted state, a first seal 42 is arranged between the flange 14 and the hydraulic pump 16.

Accordingly, the first seal 42 is arranged at the flange/pump-side coupling region 38*b* at a transition of the first flange-side hydraulic connection 16*a* of the hydraulic pump 16 and the pump-side hydraulic connection 14*b* of the flange 14.

Furthermore, a second seal 44 is arranged at the flange/control plate-side coupling region 40 at a transition of the control plate-side hydraulic connection 14*c* of the flange 14 and the second flange-side hydraulic connection 18*c* of the control plate 18.

In addition, a third seal 46 is additionally arranged at the flange/control plate-side coupling region 40 at a transition between the control plate-side feedthrough interface 14*e* of the flange 14 and the flange-side feedthrough interface 18*e* of the control plate 18.

Between the flange 14 and the drive motor 12 there is further arranged a further fourth seal 48.

The fourth seal 48 is arranged at the flange/motor-side coupling region 38*a*.

Furthermore, a fifth seal 48*a* for sealing the shaft tunnel 30 is arranged at the flange/pump-side coupling region 38*b* at a pump-side end of the shaft tunnel 30 and the hydraulic pump 16.

Moreover, according to FIG. 3, a bearing device 50 for supporting the motor shaft 32 is arranged in the flange 14.

The bearing device 50 is in the form of a rolling bearing, for example in the form of a ball bearing or cylindrical roller bearing, and at its outer ring is received in a housing shoulder of the flange housing 14*a* and secured by a securing ring.

The housing shoulder is axially attached to a motor-side end of the shaft tunnel 30 and thus forms a stepped portion of the shaft tunnel 30.

The bearing device 50, at its inner ring, is further received radially by means of a lateral surface of the motor shaft 32 and is axially secured to a shaft shoulder.

If the drive motor 12 is in the form of a brushless electric motor, an additional control or regulating electronics can be arranged in the gap between the housing shoulder of the shaft tunnel 30 and the main body of the drive motor 12.

The flange 14 can additionally have a further hydraulic bore (not shown in FIG. 3), by means of which the hydraulic tank 22 and the control plate 18 can be connected.

According to a further exemplary embodiment, the flange 14 can also additionally or alternatively have a further hydraulic line, by means of which the hydraulic tank 22 and the control plate 18 can be connected.

The flange 14 further comprises a cooling body (not shown in FIG. 3).

To this end, the flange 14, or the flange housing 14*a* thereof, can have a plurality of cooling fins or cooling webs.

The function of the hydraulic supply system 10 according to the disclosed embodiments and in particular of the flange 14 will now be described as follows:

Generally, the function of the hydraulic supply system 10 is to provide to the hydraulic consumers of the rail vehicle (e.g., level control cylinders, power generators, other hydraulic functional elements) a hydraulic pressure or mass flow that is controlled or regulated, that is to say in accordance with demand To this end, the flange 14 has the function of mechanically receiving the hydraulic pump 16, or providing a device for fastening it to the drive motor 12.

In the mounted state, the flange 14 is in the form of an integral or one-piece part of the electric motor 12.

On the other hand, the flange 14 serves to forward the control and regulating commands coming from the control and regulating device 24, which are transmitted by means of the control and regulating cables to the drive motor 12.

These cables extend inside the flange 14 in the electrical coupling element 28 in the form of the cable feedthrough provided therefor to the drive motor 12 or to the electronics thereof (in the case of a brushless electric motor).

Alternatively, it is also conceivable that the drive motor 12 is designed to be uncontrolled and/or unregulated, so that the integrated control or regulating electronics can be omitted.

Furthermore, a hydraulic connection between a pressure side of the hydraulic pump 16 and a pressure input of the control plate 18 can be provided through the flange 14, in order to supply the control plate 18 with hydraulic operating pressure as required.

The flange 14 further has the function of providing a mechanical receiver for the bearing device 50 of the drive motor 12.

In addition, the flange 14 forms a central point for fastening the assembly group consisting of the drive motor 12, the flange 14 and the hydraulic pump 16 to the control plate 18.

As illustrated in FIG. 3, both the drive motor 12 and the hydraulic pump are screwed to the flange 14 by means of screws.

The flange 14 is in turn screwed to the control plate 18 by means of screws.

The two ends 32*a*, 34*a* of the pump and motor shaft 32, 34 are likewise arranged inside the flange 14 and can thus be protected by means of the seals 42, 44, 46, 48, 48*a* in particular against the ingress of hydraulic oil from the hydraulic tank 22.

In the case of a brushless drive motor 12, the flange 14 additionally serves to dissipate heat from the control and regulating electronics necessary therefor by means of the cooling body.

Alternatively, it can be provided that the flange 14, by means of the further hydraulic bore (not shown in the figures), ensures a simple return of the hydraulic oil or hydraulic fluid from the control plate 18 into the hydraulic tank 22.

LIST OF REFERENCE NUMERALS

10 hydraulic supply system
10*a* first part-region of the hydraulic supply system
10*b* second part-region of the hydraulic supply system
12 drive motor
14 flange
14*a* flange housing
14*b* pump-side hydraulic connection
14c control plate-side hydraulic connection
14*d* motor-side feedthrough interface
14*e* control plate-side feedthrough interface
16 hydraulic pump
16*a* first flange-side hydraulic connection of the hydraulic pump
18 control plate
18*a* first broad face of the control plate
18*b* second broad face of the control plate
18*c* second flange-side hydraulic connection of the control plate
18*d* control plate cable feedthrough
18*e* flange-side feedthrough interface
20 further hydraulic or electrohydraulic components
22 hydraulic tank
24 control and regulating device
26 connector
28 electrical coupling element
30 shaft tunnel
32 motor shaft
32*a* end of the motor shaft
34 pump shaft
34*a* end of the pump shaft
36 coupling
36*a* damping element of the coupling
38*a* flange/motor-side coupling region
38*b* flange/pump-side coupling region
40 flange/control plate-side coupling region
42 first seal
44 second seal
46 third seal
48 fourth seal
48*a* fifth seal
50 bearing device

The invention claimed is:

1. A hydraulic supply system for at least one rail vehicle, the system comprising:

at least one drive motor;

at least one flange;

at least one hydraulic pump; and at least one control plate for receiving and/or controlling further electrical and/or hydraulic components of the hydraulic supply system, wherein the flange, in a mounted state, is fastened to the drive motor and to the hydraulic pump for the mutual mechanical coupling thereof, wherein the flange is fastened to the control plate, wherein the flange further has at least one connector for the coupling of the hydraulic pump with the control plate, wherein the flange has at least one electrical coupling element for the electrical coupling of the drive motor with the control plate, and wherein the connector is at least one hydraulic line and/or at least one hydraulic bore.

2. The hydraulic supply system of claim 1, wherein the flange is an integral part of the drive motor, wherein at least one mechanical receiver for the hydraulic pump is formed by the flange.

3. The hydraulic supply system of claim 1, wherein the electrical coupling element is at least one flange cable feedthrough and/or at least one flange cable duct.

4. The hydraulic supply system of claim 1, wherein the flange has at least one flange housing in which the electrical coupling element and/or the connector are integrated.

5. The hydraulic supply system of claim 1, wherein the hydraulic supply system has at least one control and/or regulating device which, in a mounted state, is electrically connected by the control plate and/or the electrical coupling element to the drive motor.

6. The hydraulic supply system of claim 1, wherein the drive motor and the hydraulic pump in a fastened state are mechanically fastened by the flange to at least one face of the control plate.

7. The hydraulic supply system of claim 1, wherein the flange has at least one shaft tunnel in which an end of at least one motor shaft of the drive motor and an end of at least one pump shaft of the hydraulic pump are coupled in a rotationally fixed manner by at least one coupling.

8. The hydraulic supply system of claim 7, wherein the at least one bearing device for supporting the motor shaft is arranged in the flange.

9. The hydraulic supply system of claim 1, wherein, in a mounted state, at least a first seal is arranged between the flange and the hydraulic pump and/or at least a second seal is arranged between the flange and the control plate.

10. The hydraulic supply system of claim 1, further comprising at least one hydraulic tank in which, in a mounted state, the drive motor and the flange as well as the hydraulic pump are arranged.

11. The hydraulic supply system of claim 1, wherein the flange has at least one further hydraulic line and/or at least one further hydraulic bore by which the hydraulic tank and the control plate are connected.

12. The hydraulic supply system of claim 1, wherein the flange has at least one cooling body.

13. The hydraulic supply system of claim 1, wherein the flange, in a mounted and operation-ready state, is arranged between the drive motor and the hydraulic pump.

* * * * *